(12) United States Patent
Oryoji

(10) Patent No.: US 11,302,021 B2
(45) Date of Patent: Apr. 12, 2022

(54) INFORMATION PROCESSING APPARATUS AND INFORMATION PROCESSING METHOD

(71) Applicant: SONY CORPORATION, Tokyo (JP)

(72) Inventor: Hiroshi Oryoji, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 16/329,014

(22) PCT Filed: Jul. 31, 2017

(86) PCT No.: PCT/JP2017/027686
§ 371 (c)(1),
(2) Date: Feb. 27, 2019

(87) PCT Pub. No.: WO2018/078986
PCT Pub. Date: May 3, 2018

(65) Prior Publication Data
US 2019/0206074 A1    Jul. 4, 2019

(30) Foreign Application Priority Data

Oct. 24, 2016  (JP) .............................. JP2016-207863

(51) Int. Cl.
| | |
|---|---|
| *G06T 17/20* | (2006.01) |
| *G06T 7/593* | (2017.01) |
| *G06T 7/73* | (2017.01) |
| *H04N 5/232* | (2006.01) |

(52) U.S. Cl.
CPC ............. *G06T 7/593* (2017.01); *G06T 7/73* (2017.01); *G06T 7/75* (2017.01); *G06T 17/20* (2013.01); *H04N 5/232* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 5,179,441 A | * | 1/1993 | Anderson | G06K 9/32 348/43 |
| 5,606,627 A | * | 2/1997 | Kuo | G01C 11/06 382/154 |
| 5,818,959 A | * | 10/1998 | Webb | H04N 13/243 382/154 |

(Continued)

FOREIGN PATENT DOCUMENTS

| | | |
|---|---|---|
| EP | 2000953 A2 | 12/2008 |
| EP | 2202672 A1 | 6/2010 |

(Continued)

OTHER PUBLICATIONS

International Search Report and Written Opinion of PCT Application No. PCT/JP2017/027686, dated Oct. 24, 2017, 10 pages of ISRWO.

*Primary Examiner* — Soo Shin
(74) *Attorney, Agent, or Firm* — Chip Law Group

(57) ABSTRACT

Provided is an information processing apparatus, including: an estimation processing section that, on the basis of three-dimensional data and a first image feature value that are set and a second image feature value that is acquired from a captured image captured by a first imaging apparatus, estimates a position and attitude of the first imaging apparatus.

16 Claims, 8 Drawing Sheets

(56) References Cited

U.S. PATENT DOCUMENTS

| | | | |
|---|---|---|---|
| 7,747,151 B2 * | 6/2010 | Kochi | G01C 11/06 396/55 |
| 8,126,260 B2 * | 2/2012 | Wallack | G06T 7/73 382/154 |
| 2002/0041327 A1 * | 4/2002 | Hildreth | G06K 9/00375 348/42 |
| 2003/0202691 A1 | 10/2003 | Beardsley | |
| 2008/0304707 A1 | 12/2008 | Oi et al. | |
| 2012/0039511 A1 | 2/2012 | Oi et al. | |
| 2013/0108108 A1 | 5/2013 | Oi et al. | |
| 2013/0121559 A1 * | 5/2013 | Hu | G06T 7/593 382/154 |
| 2014/0169636 A1 * | 6/2014 | Hara | G06T 7/80 382/106 |
| 2014/0334679 A1 | 11/2014 | Oi et al. | |
| 2015/0009294 A1 * | 1/2015 | Izawa | H04N 13/261 348/46 |
| 2019/0012804 A1 * | 1/2019 | Wang | G06T 3/4038 |
| 2019/0206074 A1 * | 7/2019 | Oryoji | G06T 17/20 |

FOREIGN PATENT DOCUMENTS

| | | | |
|---|---|---|---|
| GB | 2411532 A * | 8/2005 | H04N 5/2224 |
| JP | 2004-127239 A | 4/2004 | |
| JP | 2008-304268 A | 12/2008 | |
| JP | 2014-164483 A | 9/2014 | |
| JP | 2016-042639 A | 3/2016 | |
| JP | 2016-42639 A | 3/2016 | |
| JP | 2016-126425 A | 7/2016 | |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/027686 filed on Jul. 31, 2017, which claims priority benefit of Japanese Patent Application No. JP 2016-207863 filed in the Japan Patent Office on Oct. 24, 2016. Each of the above-referenced applications is hereby incorporated herein by reference in its entirety.

TECHNICAL FIELD

The present disclosure relates to an information processing apparatus, an information processing method, and a program.

BACKGROUND ART

A technology has been developed that generates a free viewpoint image on the basis of captured images captured by a plurality of imaging apparatuses arranged fixedly. As the above-described technology, for example, a technology described in the below-described Patent Literature 1 is cited.

CITATION LIST

Patent Literature

Patent Literature 1: JP 2016-126425A

DISCLOSURE OF INVENTION

Technical Problem

There exists a technique that performs three-dimensional estimation (hereinafter, for convenience, indicated as "a three-dimensional estimation method utilizing a fixed camera") by utilizing captured images captured by a plurality of imaging apparatuses arranged at fixed positions. As the three-dimensional estimation method having utilized a fixed camera, for example, "Visual Hull" and "Multi-View Stereo" are cited.

For example, by using the three-dimensional estimation method having utilized the existing fixed camera as described in the above, it is possible to estimate a three-dimensional structure of an animal body. However, in the case where the three-dimensional estimation method utilizing the existing fixed camera as described in the above is used, when occlusion occurs, since the position of an imaging apparatus is fixed, it is difficult to cancel the occlusion. Therefore, in the case of using the three-dimensional estimation method utilizing the existing fixed camera as described in the above, it may happen that the estimation of a three-dimensional structure of an object cannot be performed.

As a method of attempting to cancel the occlusion as described in the above, considered is, for example, a method of utilizing a captured image captured by an imaging apparatus in which one or both of a position and an attitude is changeable like a portable type imaging apparatus.

Here, there exists a method (hereinafter, for convenience, indicated as "a three-dimensional estimation method utilizing a portable camera") of performing three-dimensional estimation by utilizing a captured image captured by an imaging apparatus in which one or both of a position and an attitude is changeable. As the three-dimensional estimation method utilizing a portable camera, for example, "Structure from Motion" is cited.

However, in the case where the three-dimensional estimation method having utilized the existing portable cameras as described in the above is used, it is difficult to estimate the position and attitude of an imaging apparatus. Moreover, since it is difficult to estimate the position and attitude of an imaging apparatus, in the case where the three-dimensional estimation method having utilized the existing portable cameras as described in the above is used, it is difficult to estimate a three-dimensional structure of an animal body. Therefore, for example, even if utilizing the three-dimensional estimation method having utilized the existing portable camera as described in the above, it may happen that the estimation of a three-dimensional structure of an object cannot be performed.

Therefore, for example, in order to further improve the estimation accuracy of a three-dimensional structure of an object by utilizing a captured image captured by an imaging apparatus in which one or both of a position and an attitude is changeable, it is considered that it becomes necessary to estimate the position and attitude of an imaging apparatus.

In the present disclosure, proposed are a novel and improved information processing apparatus, information processing method, and program, which can estimate a position and attitude of an imaging apparatus.

Solution to Problem

According to the present disclosure, there is provided an information processing apparatus, including: an estimation processing section that, on the basis of three-dimensional data and a first image feature value that are set and a second image feature value that is acquired from a captured image captured by a first imaging apparatus, estimates a position and attitude of the first imaging apparatus.

Moreover, according to the present disclosure, there is provided an information processing method executed by an information processing apparatus, the information processing method including: a step of setting three-dimensional data and a first image feature value; and a step of estimating, on the basis of the three-dimensional data and the first image feature value that are set and a second image feature value that is acquired from a captured image captured by a first imaging apparatus, a position and attitude of the first imaging apparatus.

Moreover, according to the present disclosure, there is provided a program that makes a computer realize: a function that sets three-dimensional data and a first image feature value; and a function that estimates, on the basis of the three-dimensional data and the first image feature value that are set and a second image feature value acquired from a captured image captured by a first imaging apparatus, a position and attitude of the first imaging apparatus.

Advantageous Effects of Invention

According to the present disclosure, it is possible to estimate a position and attitude of an imaging apparatus.

Note that the effects described above are not necessarily limitative. With or in the place of the above effects, there

MODE(S) FOR CARRYING OUT THE INVENTION

Figure 1:
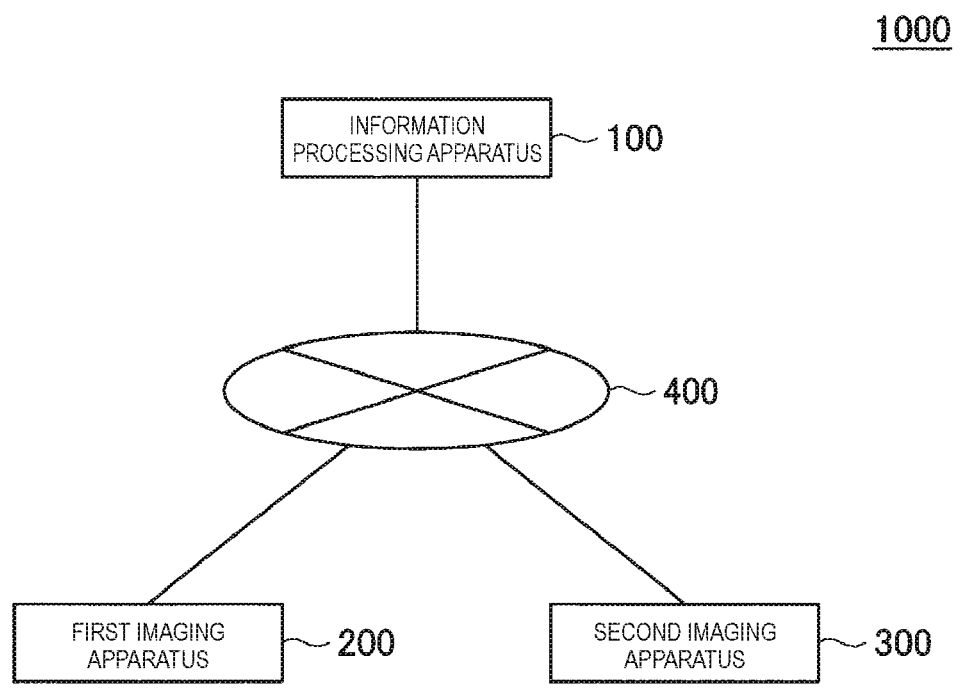
FIG. 1 is an explanatory diagram showing one example of an information processing system according to the present embodiment to which an information processing method according to the present embodiment is applied.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, hereinafter, description is given in an order shown in the below description.

1. Information processing method according to present embodiment
2. Information processing apparatus according to present embodiment
3. Program according to present embodiment (Information Processing Method According to Present Embodiment)

First, an information processing method according to the present embodiment is described. Hereinafter, cited is, as an example, a case where an information processing apparatus according to the present embodiment performs a process related to an information processing method according to the present embodiment.

[1] Information Processing System to Which Information Processing Method According to Present Embodiment is Applied Before describing an information processing method according to the present embodiment, described is one example of an information processing system according to the present embodiment to which an information processing method according to the present embodiment is applied.

FIG. 1 is an explanatory diagram showing one example of an information processing system 1000 according to the present embodiment to which an information processing method according to the present embodiment is applied.

The information processing system 1000, for example, includes an information processing apparatus 100, a first imaging apparatus 200, and a second imaging apparatus 300.

The information processing apparatus 100, the first imaging apparatus 200, and the second imaging apparatus 300 are connected, for example, wirelessly or with wires through a network 400. As the network 400, cited are, for example, wired networks, such as local area network (LAN) and wide area network (WAN), wireless networks, such as wireless local area network (WLAN), or Internet using communication protocols, such as transmission control protocol/internet protocol (TCP/IP). In this connection, in the information processing system according to the present embodiment, it is also possible for the information processing apparatus 100 to communicate directly with each of the first imaging apparatus 200 and the second imaging apparatus 300 without involving the network 400.

The information processing apparatus 100 performs processes related to the information processing method according to the present embodiment. One example of a configuration of the information processing apparatus 100 will be mentioned later.

The first imaging apparatus 200 is, for example, a portable type imaging apparatus in which one or both of a position and an attitude is or are changeable. In the information processing system 1000, the first imaging apparatus 200 corresponds to an apparatus of a processing object for which the information processing apparatus 100 estimates a position and an attitude.

As the first imaging apparatus 200, cited is, for example, a portable type camera such as a portable type digital still camera and a portable type digital video camera. In this connection, the application examples of the first imaging apparatus 200 are not limited to the examples shown in the above description. The other application examples of the first imaging apparatus 200 will be mentioned later.

The second imaging apparatus 300 is an imaging device whose position and attitude are known. Here, the definition that the position and attitude according to the present embodiment are known means that, for example, it is possible for the information processing apparatus 100 to specify the position and the attitude uniquely.

As the second imaging apparatus 300, cited is for example, a camera whose at least position is fixed (hereinafter, may be indicated as a "fixed camera"), such as a digital still camera having been installed at a fixed position set beforehand and a digital video camera having been installed at a fixed position set beforehand. Moreover, the second imaging apparatus 300 may be a camera whose position and attitude are fixed. In this connection, the application examples of the second imaging apparatus 300 are not limited to the examples indicated in the above description. The other application examples of the second imaging apparatus 300 will be mentioned later.

The information processing system 1000 includes, for example, a configuration as described in the above.

In this connection, a configuration of the information processing system according to the present embodiment is not limited to the example shown in FIG. 1.

For example, in FIG. 1, a configuration including one first imaging apparatus 200 is shown. However, the information processing system according to the present embodiment may include a plurality of first imaging apparatuses 200. In the case of a configuration including a plurality of first imaging apparatuses 200, the information processing apparatus 100 estimates a position and attitude of each of the plurality of first imaging apparatuses 200.

Moreover, for example, in FIG. 1, a configuration including one second imaging apparatus 300 is shown. However, the information processing system according to the present embodiment may include a plurality of second imaging apparatuses 300. In the case of a configuration including a plurality of second imaging apparatuses 300, each of the plurality of second imaging apparatuses 300 is disposed at, for example, one of positions different from each other.

Moreover, the information processing system according to the present embodiment may have a configuration not including the second imaging apparatus 300.

[2] Outline of Information Processing Method According to Present Embodiment

With citing, as an example, a case where the information processing method according to the present embodiment is applied to the information processing system 1000, the information processing method according to the present embodiment is described.

As a process related to the information processing method according to the present embodiment, for example, the information processing apparatus 100 performs an estimating process indicated in the below-described (1).

(1) Estimating Process

The information processing apparatus 100 estimates the position and attitude of the first imaging apparatus 200 on the basis of three-dimensional data and a first image feature value each of which is set and a second image feature value acquired from a captured image captured by the first imaging apparatus 200.

The three-dimensional data according to the present embodiment is, for example, data, in an arbitrary format, capable of expressing three-dimensionally an object existing in a three-dimensional space expressed with a horizontal direction, a vertical direction, and a depth direction.

As the three-dimensional data according to the present embodiment cited are, for example, data generated by the matter that a three-dimensional construction process on the basis of a plurality of two-dimensional images (hereinafter, indicated merely as "image") is performed, or the like, or data generated from a three-dimensional model, such as a three-dimensional model showing a robot.

Figure 2:
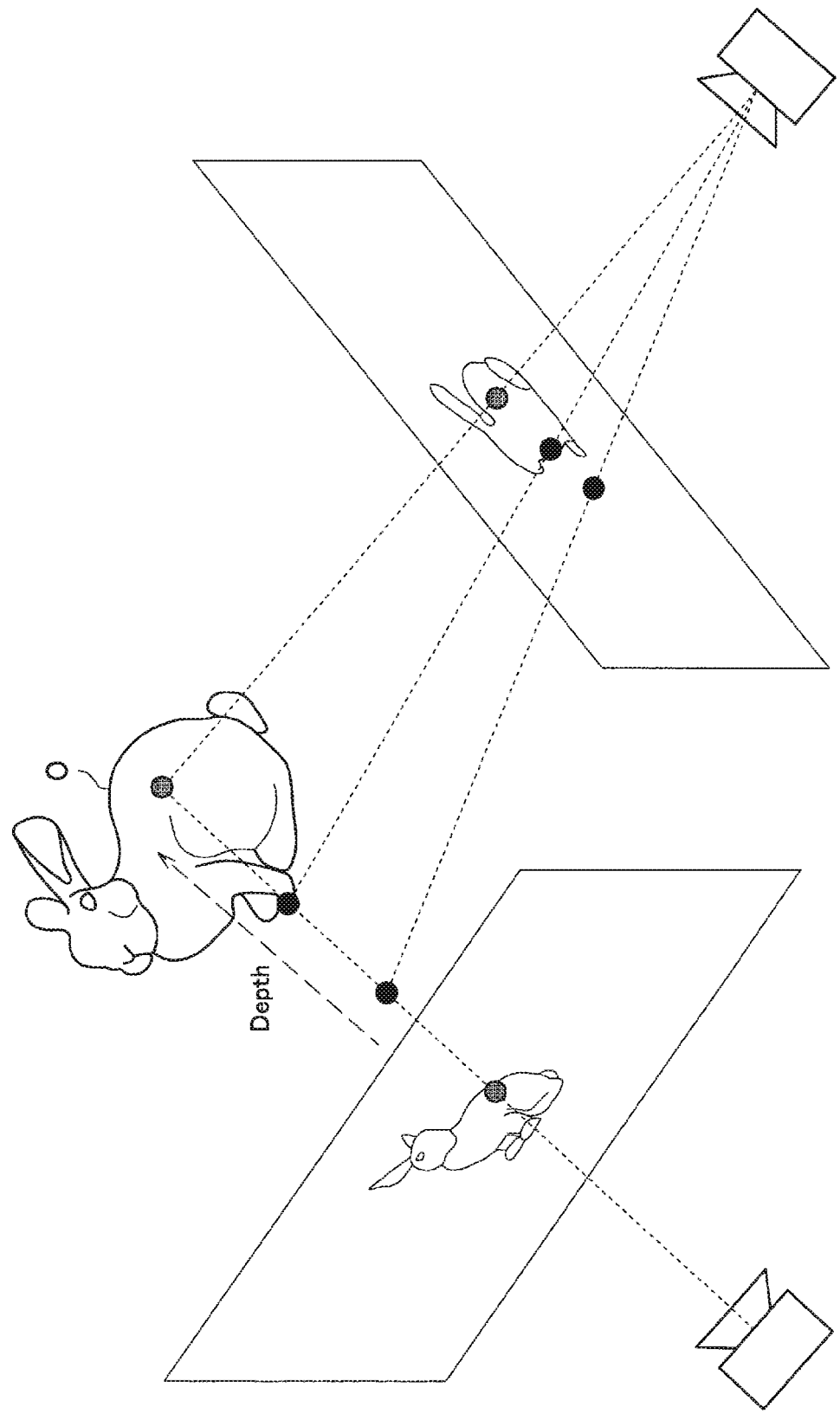
FIG. 2 is an explanatory illustration for describing one example of an acquiring method of three-dimensional data according to the present embodiment.

FIG. 2 is an explanatory illustration for describing one example of a process related to acquisition of three-dimensional data according to the present embodiment, and shows one example of a three-dimensional construction process. FIG. 2 shows one example of a three-dimensional construction process on the basis of two captured images in which an object O has been imaged by two imaging apparatuses that exist at the respective positions different from each other.

For example, in the case where the position and attitude of each of the imaging apparatuses are specified, the three-dimensional restoration of the object O can be performed by performing correspondence between the position and attitude of each of the imaging apparatuses and a feature point in a captured image captured by each of the imaging apparatuses. The correspondence of a feature point in a captured image can be performed, for example, by using an image feature value mentioned later. Therefore, for example, by performing the process related to the three-dimensional restoration as described in the above as the three-dimensional construction process, the three-dimensional data corresponding to the object O can be acquired. In this connection, the three-dimensional construction process on the basis of a plurality of images according to the present embodiment is not limited to the example indicated in the above description, and may be an arbitrary process capable of acquiring three-dimensional data on the basis of an image.

As shown in FIG. 2, by using captured images captured by a plurality of imaging apparatuses in each of which the position and the attitude are specified, it is possible to acquire three-dimensional data.

Here, in the second imaging apparatus 300 that constitutes the information processing system 1000, the position and the attitude are known. Therefore, three-dimensional data according to the present embodiment may be the three-dimensional data generated on the basis of a captured image captured by the second imaging apparatus 300. In the case where the information processing system according to the present embodiment includes a plurality of second imaging apparatuses 300, for example, three-dimensional data are generated by performing three-dimensional restoration on the basis of captured images captured by the second imaging apparatuses 300 that constitute the information processing system according to the present embodiment.

The three-dimensional data according to the present embodiment is, for example, set by being memorized in a recording medium, such as a memory section (mentioned later) that the information processing apparatus 100 equips, or an external recording medium connected to the information processing apparatus 100. For example, in the case where three-dimensional data is set in a recording medium, such as a memory section (mentioned later), the information processing apparatus 100 acquires three-dimensional data by reading out the three-dimensional data from the concerned recording medium.

The three-dimensional data, for example, may be set by the matter that the information processing apparatus 100 performs a later-mentioned setting process, or may be set by an external apparatus of the information processing apparatus 100.

The image feature value according to the present embodiment is a value that shows the feature of a two-dimensional image quantitatively. As the image feature value according to the present embodiment, cited are, for example, scale-invariant feature transform (SIFT), speeded up robust features (SURF), Haar-like, and histogram of oriented gradients (HOG).

The first image feature value according to the present embodiment is an image feature value that is set as described in the above. The first image feature value is set, for example, by being memorized in a recording medium, such as a memory section (mentioned later) that the information processing apparatus 100 equips, or an external recording medium connected to the information processing apparatus 100.

For example, in the case where a first image feature value is set in a recording medium, such as a memory section (mentioned later), the information processing apparatus 100 acquires a first image feature value by reading out the first image feature value from the concerned recording medium. That is, for example, an image feature value memorized in a recording medium, such as a memory section (mentioned later), that the information processing apparatus 100 can read out, corresponds to the first image feature value.

The first image feature value, for example, may be set by the matter that the information processing apparatus 100 performs a later-mentioned setting process, or may be set by an external apparatus of the information processing apparatus 100.

The second image feature value is, as described in the above, an image feature value acquired from a captured image captured by the first imaging apparatus 200. Moreover, the second image feature value is an image feature value of the same kind as the first image feature value. The process of acquiring the second image feature value from a captured image may be performed by the information processing apparatus 100, or may be performed in an external apparatus of the information processing apparatus 100, such as the first imaging apparatus 200.

Figure 3:
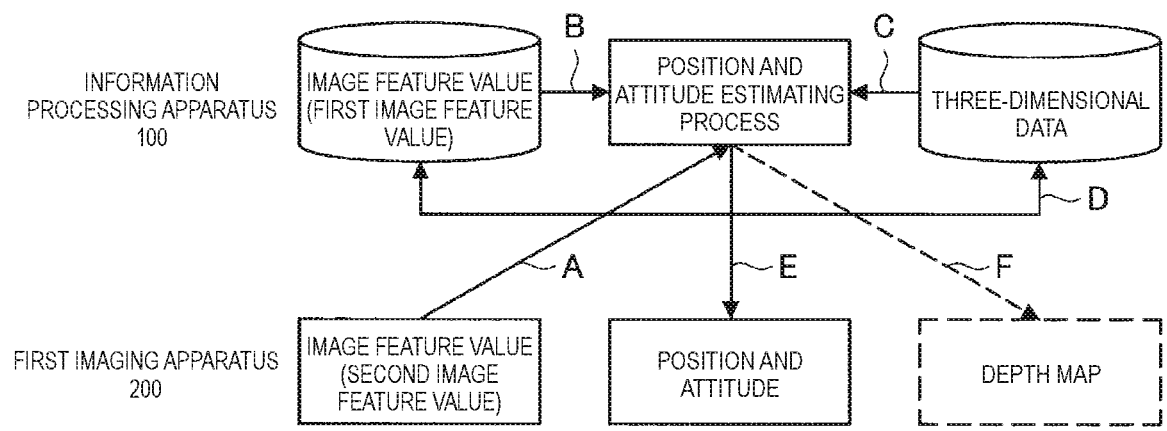
FIG. 3 is an explanatory diagram for describing one example of a process related to an information processing method according to the present embodiment.

FIG. 3 is an explanatory diagram for describing an outline of the process related to the information processing method according to the present embodiment. FIG. 3 shows an outline of the process related to the information processing method according to the present embodiment in the case where an estimating process and a transmission control process mentioned later are performed.

The information processing apparatus 100, for example, as shown with A in FIG. 3, acquires a second image feature value corresponding to a captured image captured by the first imaging apparatus 200. Here, in A in FIG. 3, shown is an example where a second image feature value is detected by the first imaging apparatus 200 and the information processing apparatus 100 acquires the second image feature value from the first imaging apparatus 200.

Moreover, the information processing apparatus 100, for example, as shown in B and C in FIG. 3, acquires a first image feature value and three-dimensional data by reading out them from a recording medium.

Here, as the first image feature value that the information processing apparatus 100 acquires, cited is, for example, an image feature value corresponding to a captured image corresponding to the second image feature value acquired from the first imaging apparatus 200 in A in FIG. 3 and a captured image captured at the same time. In this connection, as mentioned later, the same time according to the present embodiment includes the perfectly same time and the time including a time difference within a setting range.

In the information processing system 1000, for example, the first imaging apparatus 200 and the second imaging apparatus 300 perform imaging with synchronization. As described in the above, by the matter that the first imaging apparatus 200 and the second imaging apparatus 300 perform imaging with synchronization, the information processing apparatus 100 can acquire a first image feature value and a second image feature value corresponding to captured images captured at the same time respectively in the first imaging apparatus 200 and the second imaging apparatus 300.

Here, the synchronization of imaging actions in the first imaging apparatus 200 and the second imaging apparatus 300 is realized, for example, by the matter that the information processing apparatus 100, a server that controls an imaging timing, or the like transmits a reference clock signal (so-called, master clock) related to the imaging action to each of the first imaging apparatus 200 and the second imaging apparatus 300. In this connection, it goes without saying that the synchronization method of an imaging action according to the present embodiment is not limited to the example shown in the above.

By using a first image feature value acquired from a captured image captured at the same time as the second imaging apparatus 300, it becomes possible for the information processing apparatus 100 to estimate the position and attitude of the first imaging apparatus 200 on the basis of an image feature value corresponding to the same object.

In this connection, in FIG. 3, a recording medium in which the three-dimensional data is memorized and a recording medium in which the first image feature value is memorized are shown as being the respective different recording media. However, the three-dimensional data and the first image feature value may be memorized in the same recording medium.

For example, as shown with D in FIG. 3, the three-dimensional data and the first image feature value are associated with each other. For example, in the case where the three-dimensional data is data acquired by the three-dimensional construction process, in the three-dimensional construction process, an image feature value in an image used for the three-dimensional construction process and the three-dimensional data acquired by the three-dimensional construction process are associated with each other. Moreover, for example, in the case where three-dimensional data is data generated from a three-dimensional model, the three-dimensional data and the first image feature value are associated with each other virtually by an algorithm etc. that are set beforehand.

Here, as the association between three-dimensional data and a first image feature value, cited is, for example, the association of the coordinate position, in a coordinate system, of an imaging apparatus in a three-dimensional space shown by three-dimensional data with a two-dimensional position in a captured image corresponding to the first image feature value. The coordinate position, in a coordinate system, of an imaging apparatus in a three-dimensional space shown by three-dimensional data and a two-dimensional position in a captured image corresponding to the first image feature value are associated with each other, for example, by being made to correspond to each other by a table (or data base) or the like and by being recorded.

In this connection, it goes without saying that the method of associating three-dimensional data with the first image feature value is not limited to the example indicated in the above description.

The information processing apparatus 100 estimates the position and attitude of the first imaging apparatus 200 on the basis of the three-dimensional data, the first image feature value, and the second image feature value, which have been acquired.

The information processing apparatus 100, for example, performs matching for making the first image feature value and the second image feature value correspond to each other. Then, the information processing apparatus 100 estimates the position and attitude of the first imaging apparatus 200 on the basis of the three-dimensional data and the image feature value acquired as a result of the matching.

Figure 4:
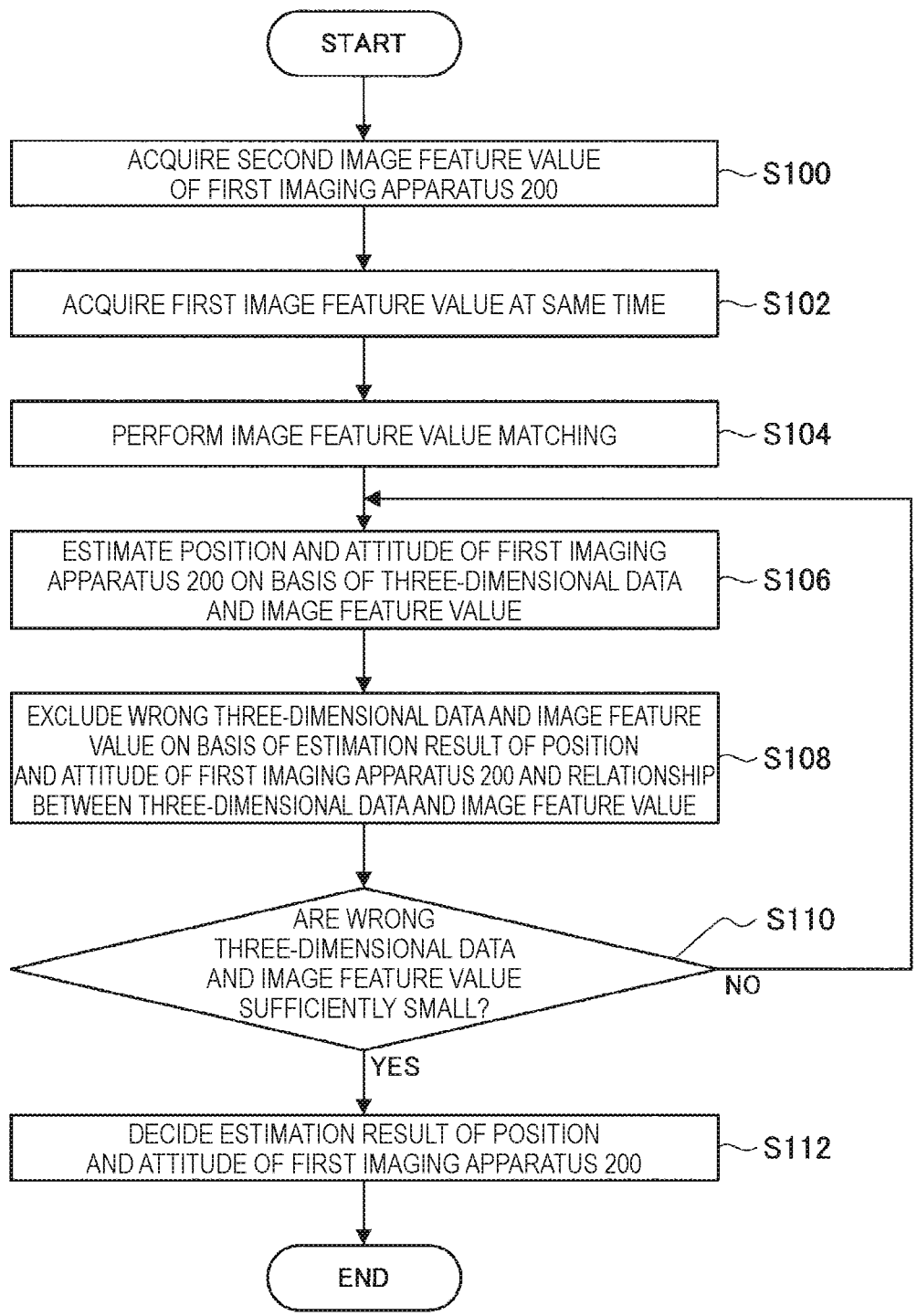
FIG. 4 is a flowchart showing one example of an estimating process related to an information processing method according to the present embodiment.

FIG. 4 is a flowchart showing one example of the estimating process related to the information processing method according to the present embodiment.

The information processing apparatus 100 acquires a second image feature value of the first imaging apparatus 200 (S100). The information processing apparatus 100, for example, acquires a second image feature value by receiving information showing a second image feature value transmitted from the first imaging apparatus 200 or by performing a process of detecting an image feature value from a captured image transmitted from the first imaging apparatus 200.

In Step S100, the information processing apparatus 100, for example, acquires information showing the time when having captured a captured image corresponding to the second image feature value, from the first imaging apparatus 200. The information showing the above-described time when having captured may be one that the first imaging apparatus 200 has transmitted on one's own initiative, or one that has been transmitted from the first imaging apparatus 200 in response to a request of the information processing apparatus 100 for transmission.

The information processing apparatus 100 acquires a first image feature value corresponding to a captured image captured at the same time as the captured image corresponding to the acquired second image feature value (S102). The information processing apparatus 100, for example, acquires a first image feature value by reading out the first image feature value from a recording medium, such as a memory section (mentioned later). The information processing apparatus 100, for example, reads out, from the above-described recording medium, a first image feature value in which the time indicated by a time stamp made to correspond to the first image feature value is the same as the time indicated by the above-described information indicating the time, or is within a range in which a time difference with the concerned time is set. That is, the same time according to the present embodiment includes the perfectly same time and the time including a time difference in a setting range. Here, the above-described time stamp, for example, is made to correspond to a first image feature value by metadata or the like.

The information processing apparatus 100 performs matching for making the second image feature value acquired in Step S100 correspond to an image feature value acquired in Step S102 (S104). By the matter that the process in Step S104 is performed, for example, the same image feature value as the first image feature value that is set, is extracted from among the acquired second image feature values. In this connection, in Step S104, an image feature value within a range in which a difference between the second image feature value and the first image feature value is set, may be extracted from among the acquired second image feature values.

The information processing apparatus 100 estimates the position and attitude of the first imaging apparatus 200 on the basis of three-dimensional data and an image feature value acquired in Step S104 as a result of the matching (S106).

Here, for example, as shown with D in FIG. 3, since the three-dimensional data and the first image feature value are associated with each other, the three-dimensional data and the image feature value acquired in Step S104 as a result of the matching are also associated with each other.

Moreover, by the matter that the three-dimensional data is associated with the image feature value acquired in Step S104 as a result of the matching, the information processing apparatus 100 can specify a two-dimensional position, in a captured image corresponding to an image feature value, corresponding to the coordinate position, in the coordinate system, of the imaging apparatus in the three-dimensional space indicated by the three-dimensional data.

For example, in the case where the coordinate position, in the coordinate system, of the imaging apparatus in the three-dimensional space indicated by the three-dimensional data is set to (xc, yc, zc) and the two-dimensional position corresponding to the concerned coordinate position is set to (u, v), the two-dimensional position (u, v), for example, is denoted by the following Formula 1 with utilizing transillumination projection.

Here, "f" shown in the following Formula 1 is, for example, an internal parameter of an imaging apparatus. As the internal parameter of an imaging apparatus, for example, cited is or are one or two or more of a focal length, an image center, an aspect ratio, and a skew. The information processing apparatus 100, for example, acquires information showing an internal parameter from the first imaging apparatus 200 by communicating with the first imaging apparatus 200. The information showing the internal parameter may be one that the first imaging apparatus 200 has transmitted on one's own initiative, or one that has been transmitted from the first imaging apparatus 200 in response to a request of the information processing apparatus 100 for transmission.

[Math. 1]

$$\begin{cases} u = f \cdot \dfrac{x_c}{z_c} \\ v = f \cdot \dfrac{y_c}{z_c} \end{cases} \quad \text{(Formula 1)}$$

The information processing apparatus 100, for example, estimates the position and attitude of the first imaging apparatus 200 by solving a perspective n point (PnP) problem using points of n (n is, for example, an integer of 3 or more) sets denoted by the above-described Formula 1.

The information processing apparatus 100 excludes wrong three-dimensional data and image feature values in the points of n sets on the basis of the estimation result of the position and attitude of the first imaging apparatus 200 and the relationship between the three-dimensional data and image feature value (S108).

By using the estimated position and attitude of the first imaging apparatus 200, the information processing apparatus 100, for example, projects all the coordinate positions (coordinate position, in the coordinate system, of the imaging apparatus in the three-dimensional space) corresponding to the points of n sets onto an image. Moreover, the information processing apparatus 100 compares a distance between each of the projection points acquired by projection and a two-dimensional position, in a captured image, corresponding to each of the above-described coordinate positions with a threshold that is set for the exclusion. Then, in the case where the above-described distance is equal to or larger than the above-described threshold for the exclusion (or, in the case where the above-described distance is larger than the above-described threshold for the exclusion), the information processing apparatus 100 excludes the concerned three-dimensional data and image feature value as wrong three-dimensional data and image feature value.

The information processing apparatus 100 determines whether or not the number of wrong three-dimensional data and image feature values is sufficiently small (S110). For example, by comparing the number of three-dimensional data and image feature values that have been determined as being wrong, with a threshold that is set for determining whether being sufficiently small, the information processing apparatus 100 determines whether or not the number of wrong three-dimensional data and image feature values is sufficiently small.

In more concrete terms, for example, in the case where the above-described number of three-dimensional data and image feature values is equal to or less than the above-described threshold for determining (or, the above-described number of three-dimensional data and image feature values is less than the above-described threshold for determining), the information processing apparatus 100 determines that the number of wrong three-dimensional data and image feature values is sufficiently small. Moreover, for example, in the case where the above-described number of three-dimensional data and image feature values is larger than the above-described threshold for determining (or, in the case where the above-described number of three-dimensional data and image feature values is equal to or larger than the above-described threshold for determining), the information processing apparatus 100 does not determine that the number of wrong three-dimensional data and image feature values is sufficiently small.

In the case where, in Step S110, it is not determined that the number of wrong three-dimensional data and image feature values is sufficiently small, the information processing apparatus 100 repeats the processes from Step S106.

Moreover, in the case where, in Step S110, it has been determined that the number of wrong three-dimensional data and image feature values is sufficiently small, the information processing apparatus 100 decides the position and attitude of the first imaging apparatus 200 that has been estimated in Step S106 (S112).

For example, by performing the processes shown in FIG. 4, on the basis of the three-dimensional data, the first image feature value, and the second image feature value, the information processing apparatus 100 estimates the position and attitude of the first imaging apparatus 200.

In this connection, an estimating method of the position and attitude of the first imaging apparatus 200 is not limited to the processes shown in FIG. 4. For example, it is possible for the information processing apparatus 100 to use an arbitrary method capable of estimating the position and attitude of the first imaging apparatus 200 on the basis of an image, such as a method of utilizing point cloud.

As the process related to the information processing method according to the present embodiment, for example, the information processing apparatus 100 performs the estimating process as described in the above. By the matter that the estimating processes as described in the above is performed, for example, even in a portable type imaging apparatus like the first imaging apparatus 200 shown in FIG. 1, a position and an attitude are estimated.

Therefore, as the process related to the information processing method according to the present embodiment, for example, by performing the estimating process as described in the above, the information processing apparatus 100 can estimate the position and attitude of an imaging apparatus.

In this connection, the process related to the information processing method according to the present embodiment is not limited to the estimating process indicated in the above-described (1).

For example, moreover, the information processing apparatus 100 may further perform one or both of a transmission control process indicated in the below-described (2) and a setting process indicated in the below-described (3).

(2) Transmission Control Process

The information processing apparatus 100 causes the information showing the estimated position and attitude of the first imaging apparatus 200 to be transmitted to an external apparatus.

As information showing a position and an attitude, cited is, for example, data including data showing the estimated position of the first imaging apparatus 200 and data showing the estimated attitude of the first imaging apparatus 200. As the data showing the position of the first imaging apparatus 200, cited is, for example, data showing the estimated absolute position of the first imaging apparatus 200 (for example, expressed with latitude and longitude). Moreover, as data showing the attitude of the first imaging apparatus 200, cited is, for example, data showing an attitude with a pitch, yaw, and low. In this connection, the data including the information showing a position and an attitude according to the present embodiment is not limited to the data shown in the above description, and may be data, in an arbitrary form, capable of showing each of a position and an attitude.

In this connection, the data included in the information showing a position and an attitude according to the present embodiment is not limited to the example shown in the above description. For example, in the information showing a position and an attitude, information showing time (for example, data showing imaging date/time, etc.) may be included.

The information processing apparatus 100, for example, causes information showing a position and an attitude to be transmitted to an external apparatus by propagating a transmission request including a transmission instruction and information showing a position and an attitude to a communication section (mentioned later) that the information processing apparatus 100 equips or an external communication device connected to the information processing apparatus 100.

As the external apparatus of a transmission destination to which the information the information processing apparatus 100 causes information showing a position and an attitude to be transmitted, cited is, for example, the first imaging apparatus 200 whose position and attitude have been estimated. In this connection, the external apparatus of a transmission destination according to the present embodiment is not limited to the first imaging apparatus 200 whose position and attitude have been estimated. For example, the information processing apparatus 100 may cause information showing a position and an attitude to be transmitted to a predetermined position that is set, such as a server that is set.

In this connection, the information that the information processing apparatus 100 causes to be transmitted is not limited to the information showing a position and an attitude.

For example, the information processing apparatus 100 may cause a depth map to be transmitted to the external apparatus. As the external apparatus of a transmission destination of a depth map, cited are, for example, a predetermined device etc. that are set, such as the first imaging apparatus 200 whose position and attitude have been estimated, and a server.

Here, a depth map is acquired, for example, by estimating a distance to an object included in a captured image by triangulation or the like on the basis of a plurality of captured images captured by an imaging apparatus whose position and attitude are specified. As the plurality of captured images related to creation of a depth map, cited is or are, for example, one or both of a captured image captured by the first imaging apparatus 200 whose position and attitude have been estimated and a captured image captured by the second imaging apparatus 300 whose position and attitude have been known. Moreover, as one example of the depth map, cited are, for example, a depth map seen from the first imaging apparatus 200 whose position and attitude have been estimated and a depth map seen from the second imaging apparatus 300.

In this connection, the process related to creation of a depth map may be performed by the information processing apparatus 100, or may be performed in an external apparatus of the information processing apparatus 100.

The information processing apparatus 100, for example, causes information showing a position and an attitude to be transmitted to an external apparatus by propagating a transmission request including a transmission instruction and information showing a depth map to a communication section (mentioned later) that the information processing apparatus 100 equips.

With reference again to FIG. 3, a transmission example of information realized by a transmission control process is described.

In response to the mater that the position and attitude of the first imaging apparatus 200 are estimated, for example, by performing the later-mentioned transmission control process, as shown with E in FIG. 3, the information processing apparatus 100 transmits the information showing the estimated position and attitude to the first imaging apparatus 200. By the matter that the information showing a position and an attitude is transmitted to the first imaging apparatus 200, for example, the first imaging apparatus 200 can recognize a position and an attitude when having performed capturing of a captured image corresponding to the second image feature value shown in A in FIG. 3.

Moreover, for example, as shown in F in FIG. 3, by performing the later-mentioned transmission control process, it is possible for the information processing apparatus 100 to also transmit a depth map to the first imaging apparatus 200.

(3) Setting Process

The information processing apparatus 100 performs a process of setting three-dimensional data and the first image feature value.

The information processing apparatus 100 performs, for example, the process of one or both of a setting process related to a first example indicated in the below-described (3-1) and a setting process related to a second example indicated in the below-described (3-2).

(3-1) First Example of Setting Process: Process Related to Initial Setting

The information processing apparatus 100 performs a process of performing the initial setting of three-dimensional data and a first image feature value.

The information processing apparatus 100, for example, performs the initial setting of three-dimensional data by generating three-dimensional data by performing three-dimensional construction process on the basis of a plurality of captured images acquired from a plurality of second imaging apparatuses 300 and by recording the generated three-dimensional data in a recording medium such as a memory section (mentioned later). Moreover, the information processing apparatus 100, for example, performs the initial setting of a first image feature value by detecting an image feature value from the above-described plurality of captured images acquired from a plurality of second imaging apparatuses 300 and by recording the detected image feature value in a recording medium such as a memory section (mentioned later).

In this connection, the setting process related to the first example is not limited to the example indicated in the above description.

For example, the information processing apparatus 100 may perform the initial setting of three-dimensional data by generating three-dimensional data from a three-dimensional model, such as a three-dimensional model showing a robot and by recording the generated three-dimensional data in a recording medium, such as a memory section (mentioned later).

Moreover, in the case where three-dimensional data is set on the basis of a three-dimensional model, such as a robot, the information processing apparatus 100, for example, detects an image feature value from a plurality of captured images acquired from a plurality of second imaging apparatuses 300 that has imaged an object corresponding to the concerned three-dimensional model. Then, the information processing apparatus 100 performs the initial setting of a first image feature value by recording the detected image feature value in a recording medium, such as a memory section (mentioned later).

(3-2) Second Example of Setting Process: Process Related to Updating

The information processing apparatus 100 performs a process of updating one or both of three-dimensional data and a first image feature value that are set.

(3-2-1) Process Related to Updating of Three-Dimensional Data

The information processing apparatus 100 updates three-dimensional data on the basis of a captured image captured by the first imaging apparatus 200 whose position and attitude have been estimated.

Here, for example, in the case where the first imaging apparatus 200 is a portable type imaging apparatus, even if a position and an attitude have been estimated on the basis of a captured image captured at a first time point, a position and an attitude at a second time point later than the first time point are not always the same as the estimated position and attitude. Therefore, the information processing apparatus 100 updates the three-dimensional data on the basis of the captured image corresponding to the second image feature value having been used for estimating a position and an attitude, that is, a captured image captured at the time point when having estimated a position and an attitude. A captured image used for updating of three-dimensional data is specified, for example, in the information processing apparatus 100 or the first imaging apparatus 200 on the basis of a time stamp or the like.

The information processing apparatus 100, for example, generates three-dimensional data by performing three-dimensional construction as described in the above on the basis of a captured image captured by the first imaging apparatus 200 whose position and attitude have been estimated and a captured image captured by other imaging apparatus whose distance to the concerned first imaging apparatus 200 is within a threshold that is set. As the above-described other imaging apparatus, cited are the second imaging apparatus 300 and other first imaging apparatus 200 whose position and attitude have been estimated.

Then, the information processing apparatus 100 updates three-dimensional data by performing an integrating process that integrates the newly generated three-dimensional data and the three-dimensional data that is set.

Here, as the integrating process according to the present embodiment, cited is, for example, a process of interpolating the three-dimensional data that is set, with newly generated three-dimensional data. In the integrating process, by the matter that stabilization in the time direction and continuity at joints of three-dimensional data are considered, it is possible to acquire three-dimensional data with higher precision.

In this connection, the integrating process according to the present embodiment is not limited to the example shown in the above description.

For example, the information processing apparatus 100 may further replace the texture with a higher-quality one on the basis of a captured image captured by the first imaging apparatus 200 whose position and attitude have been estimated and a captured image captured by the above-described other imaging apparatus.

Moreover, in each of the first imaging apparatus 200 whose position and attitude have been estimated and the above-described other imaging apparatus, in the case where audio data recorded together with imaging can be acquired, the information processing apparatus 100 may further perform audio signal processing, such as multi-stereo. Moreover, in the case of further performing the audio signal processing, the information processing apparatus 100 may replace the voice indicated by the voice data with a higher quality one (for example, less noise, loud volume, or the like).

In the case where the newly generated three-dimensional data and the three-dimensional data that is set, cannot be integrated, the information processing apparatus 100 updates three-dimensional data by recording the newly generated three-dimensional data in the recording medium in which the three-dimensional data that is set, is memorized.

Moreover, the information processing apparatus 100, for example, generates three-dimensional data by performing the three-dimensional construction as mentioned in the above on the basis of a captured image captured by the second imaging apparatus 300. Then, the information processing apparatus 100 updates the three-dimensional data by performing the integrating process that integrates the newly generated three-dimensional data and the three-dimensional data that is set.

In the case where a captured image captured by the second imaging apparatus 300 that has performed imaging in synchronization with the first imaging apparatus 200, is acquired, the information processing apparatus 100 performs the three-dimensional construction by performing the three-dimensional construction as mentioned in the above on the basis of a captured image captured by the first imaging apparatus 200 and a captured image captured by the second imaging apparatus 300. Then, the information processing apparatus 100 updates the three-dimensional data by performing the integrating process that integrates the newly generated three-dimensional data and the three-dimensional data that is set.

In this connection, in the above description, shown is an example in which the three-dimensional construction is performed as a part of the process related to the updating of the three-dimensional data that constitutes the setting process. However, the process related to the information processing method according to the present embodiment is not limited to the example shown in the above description. For example, the information processing apparatus 100 may perform the three-dimensional construction process as another process different from the setting process.

(3-2-2) Process Related to Updating of First Image Feature Value

The information processing apparatus 100 updates the first image feature value on the basis of a captured image captured by the first imaging apparatus 200 whose position and attitude have been estimated. The information processing apparatus 100, for example, updates the first image feature value by recording an image feature value detected from a captured image captured by the first imaging apparatus 200 whose position and attitude have been estimated in a recording medium in which the first image feature value is memorized.

Moreover, the information processing apparatus 100 updates the first image feature value on the basis of a captured image captured by the second imaging apparatus 300 whose position and attitude have been known. The information processing apparatus 100, for example, updates the first image feature value by recording an image feature value detected from a captured image captured by the second imaging apparatus 300 in a recording medium in which the first image feature value is memorized.

Figure 5:
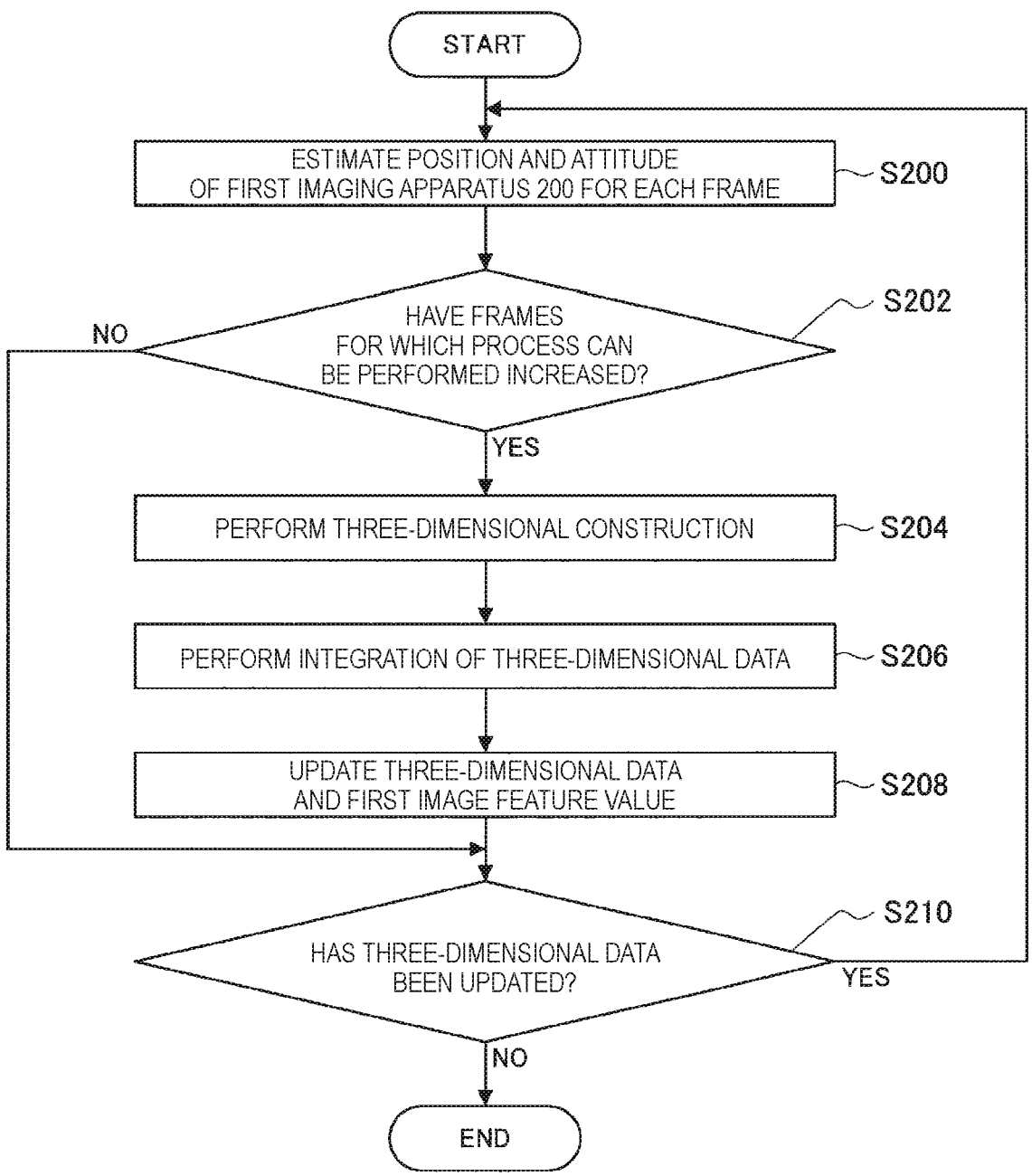
FIG. 5 is a flowchart showing one example of a process related to an information processing method according to the present embodiment.

FIG. 5 is a flowchart showing one example of the process related to the information processing method according to the present embodiment. FIG. 5 shows an estimating process performed in the case where a moving image is captured in the first imaging apparatus 200 and one example of a setting process related to the second example. A process in Step S200 shown in FIG. 5 corresponds to the estimating process, and processes in Steps S202 to S210 corresponds to the setting process related to the second example.

The information processing apparatus 100 estimates the position and attitude of the first imaging apparatus 200 for each frame in the moving image (S200). The information processing apparatus 100, for example, estimates the position and attitude of the first imaging apparatus 200 by performing the processes shown in FIG. 4 for each frame.

The information processing apparatus 100 determines whether or not frames for which a process can be performed have increased (S202). In the case where frames whose position and attitude have been estimated in the process in Step S200, have increased, the information processing apparatus 100 determines that frames for which a process can be performed have increased.

In the case where, in Step S202, it is not determined that frames for which a process can be performed have increased, the information processing apparatus 100 performs the process in Step S210 mentioned later.

Moreover, in the case where, in Step S202, it has been determined that frames for which a process can be performed have increased, the information processing apparatus 100 performs the three-dimensional construction on the basis of a captured image corresponding to the increased frames (S204). The information processing apparatus 100, for example, performs three-dimensional construction by performing an arbitrary process capable of performing three-dimensional construction on the basis of an image, such as a three-dimensional construction process as shown with reference to FIG. 2.

The information processing apparatus 100 integrates the three-dimensional data newly generated by the processes in Step S204 and the three-dimensional data that is set (S206). The information processing apparatus 100, for example, performs the integration of three-dimensional data by performing an arbitrary process capable of generating one piece of three-dimensional data from a plurality of three-dimensional data, such as a process of interpolating the three-dimensional data that is set, with the newly generated three-dimensional data.

The information processing apparatus 100 updates three-dimensional data and the first image feature value (S208). The information processing apparatus 100, for example, updates three-dimensional data by "updating with overwriting the three-dimensional data (one example of the three-dimensional data that is set) memorized in a recording medium with the three-dimensional data integrated in Step S206" or "newly recording the three-dimensional data integrated in Step S206 in the recording medium in which the three-dimensional data that is set, is recorded". Moreover, the information processing apparatus 100, for example, updates the first image feature value by newly recording an image feature value detected from an image (one example of a captured image) of a frame used in the process in Step S204 in the recording medium in which the first image feature value is set, is recorded.

In the case where, in Step S202, it is not determined that frames for which a process can be performed have increased, or in the case where the process in Step S208 has been performed, the information processing apparatus 100 determines whether or not the three-dimensional data has been updated (S210).

In the case where, in Step S210, it has been determined that the three-dimensional data has been updated, the information processing apparatus 100 repeats the processes from Step S200. Moreover, in the case where, in Step S210, it is not determined that the three-dimensional data has been updated, the information processing apparatus 100 ends the processes shown in FIG. 5.

The information processing apparatus 100, for example, updates the three-dimensional data and the first image feature value by performing the processes shown in FIG. 5.

In this connection, it goes without saying that an example of processes related to the information processing method according to the present embodiment including the setting process related to the second example is not limited to the example shown in FIG. 5.

Figure 6:
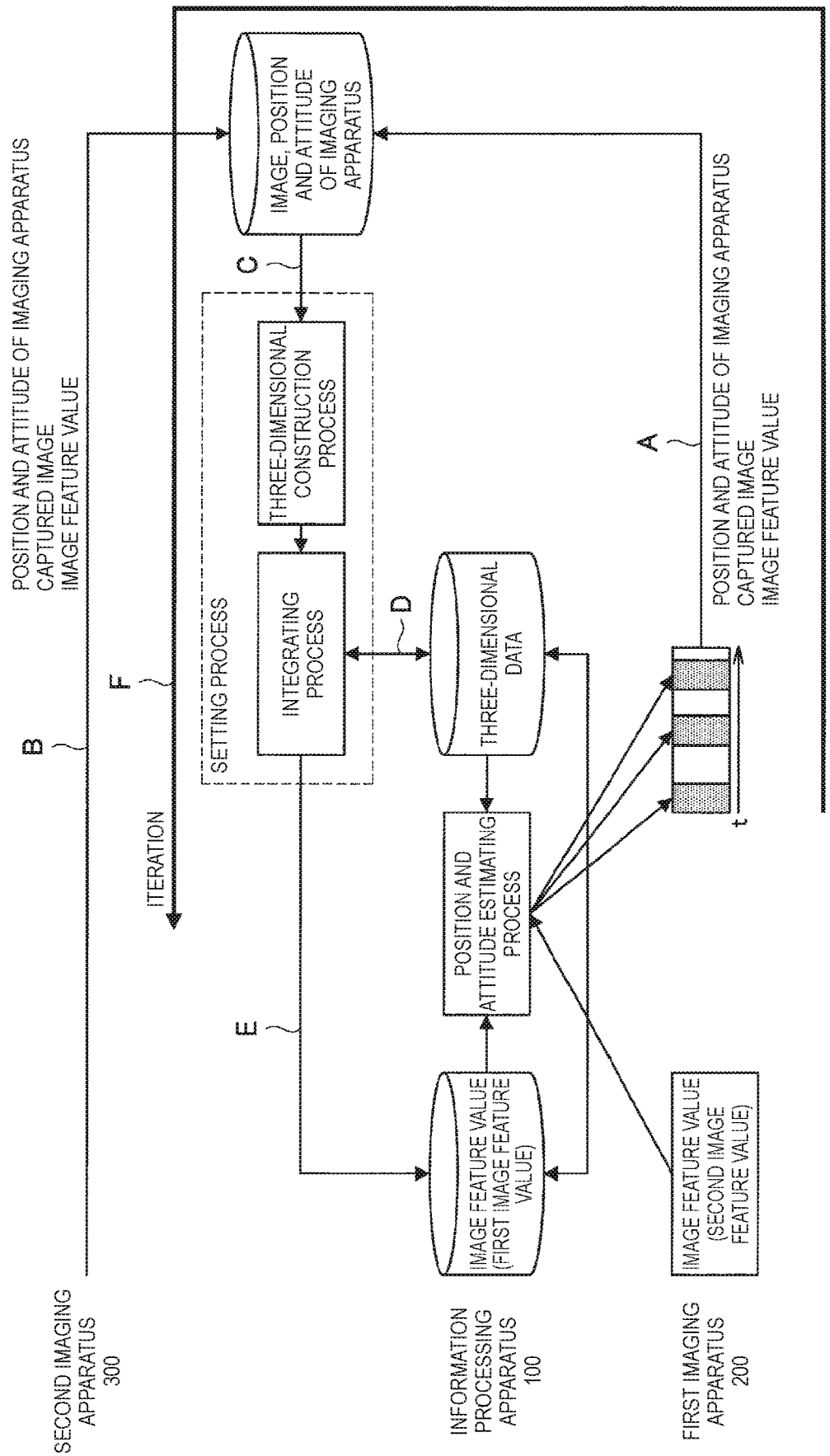
FIG. 6 is an explanatory diagram for describing other example of a process related to an information processing method according to the present embodiment.

FIG. 6 is an explanatory diagram for describing other example of processes related to the information processing method according to the present embodiment. FIG. 6 shows an outline of the processes related to the information processing method according to the present embodiment in the case where an estimating process, a transmission control process, and a setting process are performed. FIG. 6 shows an outline of the processes related to the information processing method according to the present embodiment in the case where a moving image is captured in the first imaging apparatus 200. Hereinafter, with regard to the processes (the estimating process and the transmission control process) having been described with reference to FIG. 3, description is omitted, and one example of a setting process will be described.

For example, as shown with A in FIG. 6, the position, attitude, captured image, and image feature value of the first imaging apparatus 200 corresponding to the frame whose position and attitude have been estimated, are memorized in the recording medium. In this connection, in FIG. 6, for the sake of convenience, the image data indicating a capture image and the data indicating the position and attitude of the imaging device is denoted as if they are memorized in the recording medium.

In this connection, in FIG. 6, shown is an example where the first imaging apparatus 200 performs the detection of an image feature value and transmits the data indicating an image feature value to the information processing apparatus 100. However, the detection of an image feature value may be performed in the information processing apparatus 100 (or, an external apparatus of the information processing apparatus 100, such as a server). In the case where the detection of an image feature value is performed in the information processing apparatus 100 etc., the first imaging apparatus 200 does not transmit the data indicating an image feature value to the information processing apparatus 100.

Moreover, for example, as shown with B in FIG. 6, the position, attitude, captured image, and image feature value of the second imaging apparatus 300 corresponding to a frame whose position and attitude have been estimated, are memorized in the recording medium.

In this connection, in FIG. 6, shown is an example where the second imaging apparatus 300 detects an image feature value and transmits the data showing the image feature value to the information processing apparatus 100. However, the detection of an image feature value may be performed in the information processing apparatus 100 (or, an external apparatus of the information processing apparatus 100, such as a server). In the case where the detection of an image feature value is performed in the information processing apparatus 100 etc., the second imaging apparatus 300 does not transmit the data showing an image feature value to the information processing apparatus 100.

The information processing apparatus 100, for example, as shown with C in FIG. 6, performs a setting process related to the second example on the basis of an image memorized in the recording medium, an image feature value corresponding to the concerned image, and the position and attitude of an imaging apparatus.

Here, the image memorized in the above-described recording medium corresponds to a captured image captured by the first imaging apparatus 200 whose position and attitude have been estimated, or a captured image captured by the second imaging apparatus 300. Therefore, for example, as having indicated in the above-described (3-2-1), by performing the integrating process after having performed the three-dimensional construction process on the basis of a plurality of captured images captured at the same time, the information processing apparatus 100 can update the three-dimensional data that is set, as shown with D in FIG. 6.

Moreover, for example, as having indicated in the above-described (3-2-2), by recording the image feature value detected from the above-described plurality of captured images captured at the same time in the recording medium in which the first image feature value is memorized, the information processing apparatus 100 updates the first image feature value, as shown with E of FIG. 6.

For example, as indicated as iteration in F in FIG. 6, the information processing apparatus 100, for example, repeats the processes as described in the above description until the captured image showing a new scene whose position and attitude have been estimated do not increase.

By the matter that the processes as described in the above are repeated, images etc. capable of being used for updating the three-dimensional data and the first image feature value, increase. Therefore, for example, as indicated as iteration in F in FIG. 6, by the matter that the processes as described in the above are repeated, the number of pieces of three-dimensional data increases, and the accuracy of three-dimensional data is improved. Moreover, for example, as indicated as iteration in F in FIG. 6, by the matter that the processes as described in the above are repeated, it becomes possible to raise more the estimated accuracy of the position and attitude of the first imaging apparatus 200 that is estimated by the estimating process.

As the processes related to the information processing method according to the present embodiment, for example, as mentioned in the above, cited are "the setting process indicated in the above-described (1)" or "the setting process indicated in the above-described (1) and a process of one or both of the transmission control process indicated in the above-described (2) and the setting process indicated in the above-described (3)".

In this connection, "the setting process indicated in the above-described (1)" or "the setting process indicated in the above-described (1) and a process of one or both of the transmission control process indicated in the above-described (2) and the setting process indicated in the above-described (3)" are those separated, for the sake of convenience" from the process related to the information processing method according to the present embodiment. Therefore, for example, it is possible for the processes related to the information processing method according to the present embodiment to regard the setting process indicated in the above-described (1) and a process of one or both of the transmission control process indicated in the above-described (2) and the setting process indicated in the above-described (3) as one process. Moreover, for example, it is possible to regard a process related to the information processing method according to the present embodiment as two or more processes by an arbitrary separation method.

[3] One Example of Effect Attained by Matter That Information Processing Method According to Present Embodiment is Used By the matter that the information processing method according to the present embodiment is used, for example, the effects indicated in the below description are attained. In this connection, it goes without saying that the effects attained by the matter that the information processing method according to the present embodiment is used, is not limited to the effect indicated in the below description.

Under the environment where an animal body is included, it is possible to estimate the position and attitude of each of a plurality of portable type cameras.

By utilizing three-dimensional data estimated on the basis of a captured image captured by a fixed camera, it is possible to acquire a depth map in a portable type camera.

It is possible to utilize one or both of an estimation result of the position and attitude of a portable type camera and a depth map, for example, in various applications (software), such as an application related to augmented reality (AR), an application related to visual line detection, an application related to behavior recognition.

Even under the environment where an animal body is included, the three-dimensional reconstruction that utilizes a plurality of portable type cameras, becomes possible.

By the matter that a captured image captured by a fixed camera and a captured image captured by an arbitrary portable type camera are combined and processed, it is possible to get the precision of three-dimensional estimation improved. Moreover, by the matter that it is possible to get the precision of three-dimensional estimation improved, it becomes possible to reduce the number of fixed cameras constituting an information processing system.

By the matter that a captured image captured by a fixed camera and a captured image captured by an arbitrary portable type camera are combined and processed, it is possible to raise a texture quality. Moreover, in the case where, in each of the above-described fixed camera and the above-described portable type camera, recording is further performed, it is possible to raise also an audio quality.

[4] Use Case to Which Information Processing System According to Present Embodiment is Applied As a use case to which the information processing system according to the present embodiment is applied, cited are, for example, examples indicated in the below description. In this connection, it goes without saying that a use case to which the information processing system according to the present embodiment is applied, is not limited to examples indicated in the below description.

[4-1] First Use Case: Application Example to Concert

As the first use case, an application example to a concert is described.

A plurality of fixed cameras prepared by a sponsor is installed in a concert venue. Even in the case of using only the captured images captured by the installed fixed cameras, three-dimensional configuration is possible.

In the concert venue, the fixed cameras and a smart phone (one example of a portable type camera) possessed by an audience having participated in the concert, are synchronized with each other, and it is possible for the audience to capture a still image by using the concerned smart phone during the holding of the concert (advantage of the audience side).

The audience, for example, after the end of the concert, uploads the still image to a predetermined website on a network. On the basis of the captured image captured by the fixed camera and the uploaded still image, the information processing apparatus 100 generates a higher quality texture and three dimensional data (advantage of the sponsor side).

[4-2] Second Use Case: Application Example to Athletic Meet

As the first use case, an application example to an athletic meet is described.

In a venue of an athletic meet, a plurality of fixed cameras prepared by a sponsor is installed. Even in the case of using only the captured images captured by the installed fixed cameras, three-dimensional configuration is possible.

In the venue of the athletic meet, the fixed cameras and a smart phone (one example of a portable type camera) possessed by an audience having participated in the athletic meet, are synchronized with each other, and it is possible for the audience to capture a moving image by using the concerned smart phone during the holding of the athletic meet (advantage of the audience side).

The audience, for example, after the end of the athletic meet, uploads the moving image to a predetermined website on a network. On the basis of the captured image captured by the fixed camera and the uploaded moving image, the information processing apparatus 100 generates a higher quality texture and three dimensional data (advantage of the sponsor side).

(Information Processing Apparatus According to Embodiment)

Next, an example of a configuration of the information processing apparatus according to the embodiment capable of performing the process related to the information processing method according to the embodiment described above will be described. Hereinafter, with citing, as an example, the information processing apparatus 100 constituting the information processing system 1000 shown in FIG. 1, one example of the configuration of the information processing apparatus according to the present embodiment is described.

Figure 7:
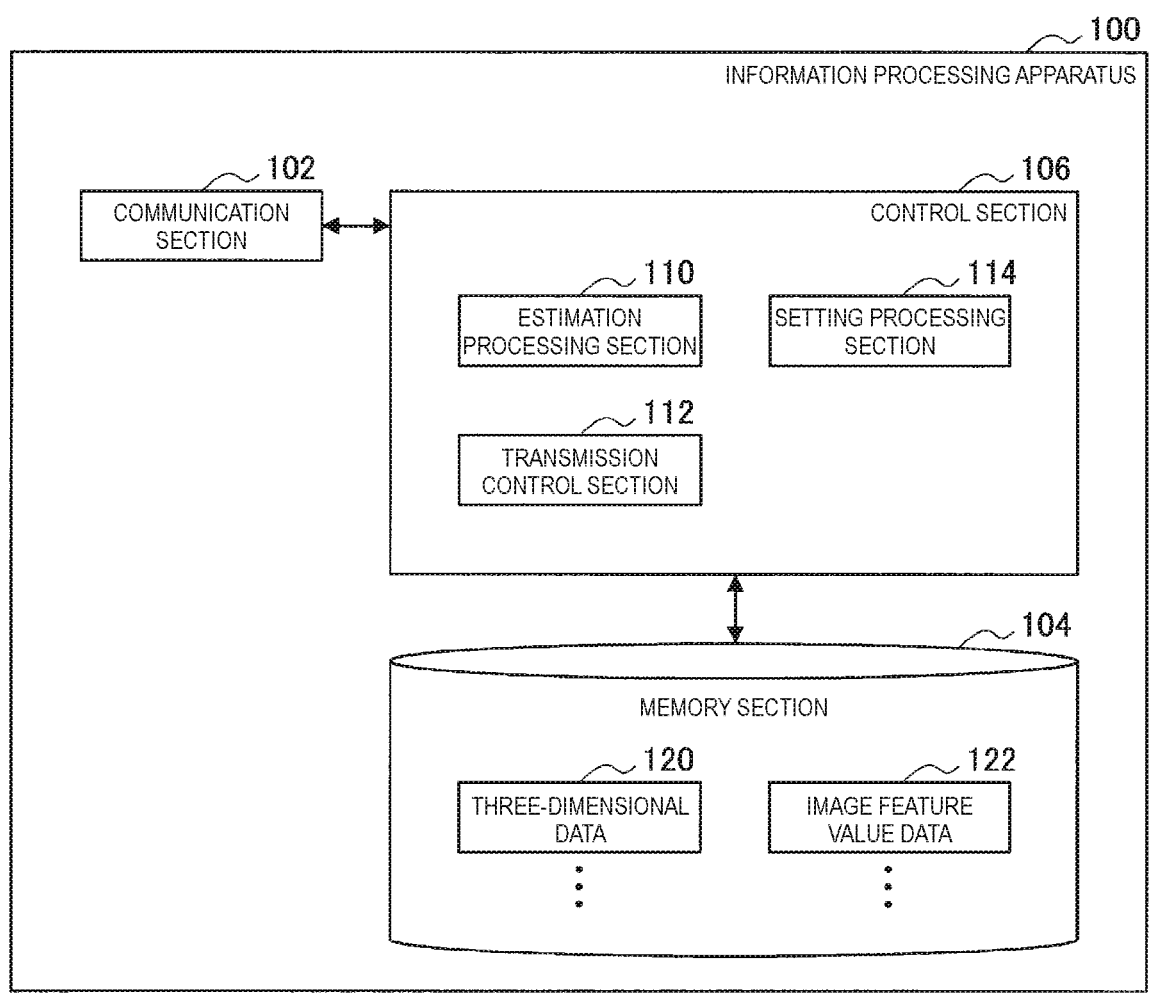
FIG. 7 is a block diagram showing one example of a configuration of an information processing apparatus according to the present embodiment.

FIG. 7 is a block diagram illustrating an example of a configuration of an information processing apparatus 100 according to the embodiment. The information processing apparatus 100 includes, for example, a communication section 102, a memory section 104, and a control section 106.

Moreover, for example, the information processing apparatus 100 may include, a read-only memory (ROM which is not illustrated), a random access memory (RAM which is not illustrated), a manipulation unit (not illustrated) which can be manipulated by a user of the information processing apparatus 100, and a display unit (not illustrated) that displays various screens on a display screen. In the information processing apparatus 100, for example, the constituent elements are connected via a bus serving as a data transmission path.

The ROM (not illustrated) stores a program or control data such as calculation parameters which are used by the control section 106. The RAM (not illustrated) temporarily stores a program or the like which is executed by the control section 106.

As the manipulation unit (not illustrated), a manipulation input device to be described below can be exemplified. Moreover, as the display unit (not illustrated), a display device to be described below can be exemplified.

[Example of Hardware Configuration of Information Processing Apparatus 100]

Figure 8:
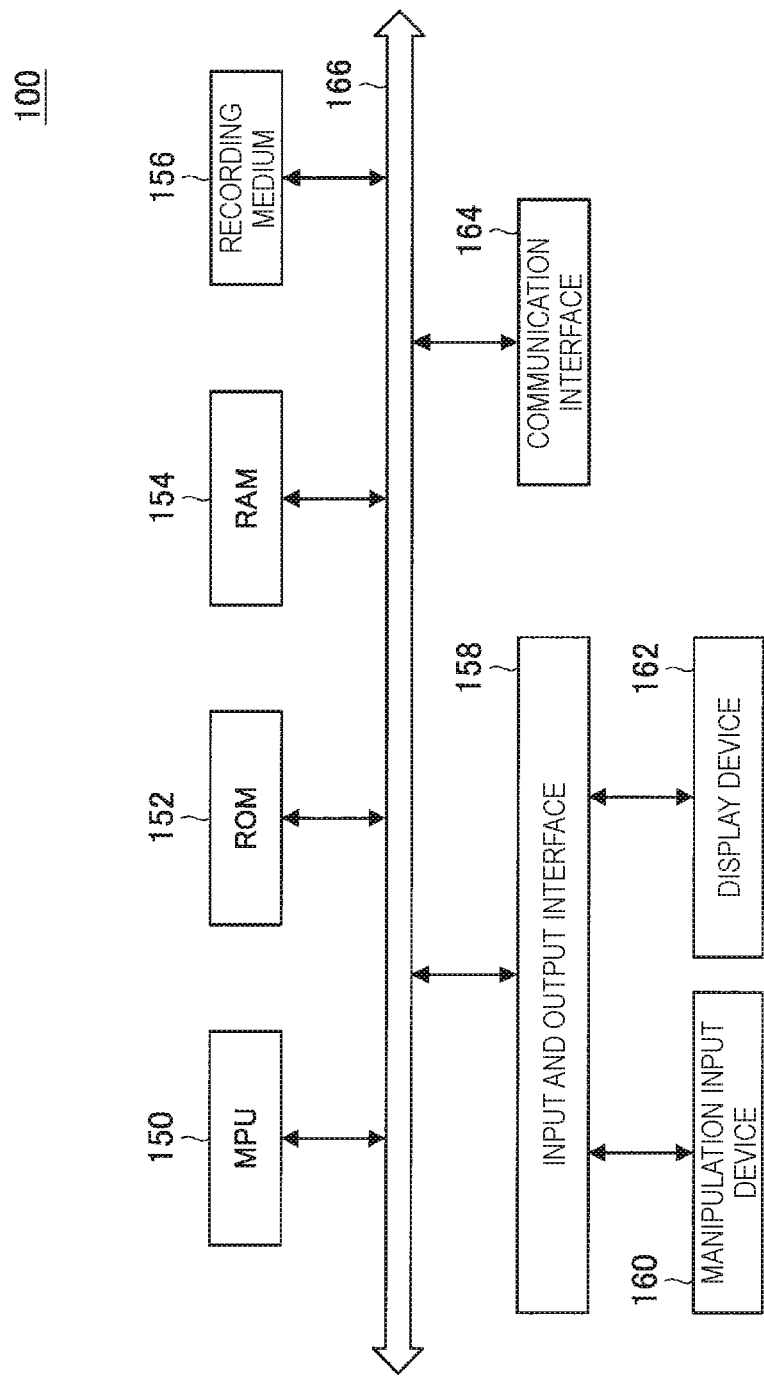
FIG. 8 is an explanatory diagram showing one example of a hardware configuration of an information processing apparatus according to the present embodiment.

FIG. 8 is an explanatory diagram illustrating an example of a hardware configuration of the information processing apparatus 100 according to the embodiment. The information processing apparatus 100 includes, for example, an MPU 150, a ROM 152, a RAM 154, a recording medium 156, an input and output interface 158, a manipulation input device 160, a display device 162, and a communication interface 164. Moreover, in the information processing apparatus 100, for example, the constituent elements are connected via a bus 166 serving as a data transmission path. Further, the information processing apparatus 100 is driven by, for example, electric power supplied from an internal power source such as a battery installed in the information processing apparatus 100, electric power supplied from a connected external power source, or the like.

For example, the MPU 150 includes one or two or more processors or various processing circuits including a calculation circuit such as a micro processing unit (MPU), and functions as the control section 106 controlling the entire information processing apparatus 100. Moreover, in the information processing apparatus 100, the MPU 150, for example, plays a role of a later-mentioned estimation processing section 110, transmission control section 112, and setting processing section 114. In this connection, one or two or more of the estimation processing section 110, the transmission control section 112, and the setting processing section 114 may include a dedicated (or general purpose) circuit capable of realizing the process of each section (for example, a processor separate from the MPU 150).

The ROM 152 stores a program or control data such as calculation parameters which is used by the MPU 150. For example, the RAM 154 temporarily stores a program or the like which is executed by the MPU 150.

The recording medium 156 functions as a memory section 104 and stores, for example, data related to the information processing method according to the embodiment, such as image feature value data showing three-dimensional data and a first image feature value, and various kinds of data such as various applications. Here, as the recording medium 156, for example, a magnetic recording medium such as a hard disk and a nonvolatile memory such as a flash memory can be exemplified. Moreover, the recording medium 156 may be detachably mounted on the information processing apparatus 100.

The input and output interface 158 connects, for example, the manipulation input device 160 or the display device 162. The manipulation input device 160 functions as a manipulation unit (not illustrated) and the display device 162 functions as a display unit (not illustrated). Here, as the input and output interface 158, for example, a universal serial bus (USB) terminal, a digital visual interface (DVI) terminal, a high-definition multimedia interface (HDMI) (registered trademark) terminal, and various processing circuits can be exemplified.

Moreover, for example, the manipulation input device 160 can be installed on the information processing apparatus 100 and is connected to the input and output interface 158 inside the information processing apparatus 100. As the manipulation input device 160, for example, a button, an arrow key, a rotary selector such as a jog dial, or a combination thereof can be exemplified.

Moreover, for example, the display device 162 can be installed on the information processing apparatus 100 and is connected to the input and output interface 158 inside the information processing apparatus 100. As the display device 162, for example, a liquid crystal display or an organic electro-luminescence display (or also referred to as an organic light emitting diode display) can be exemplified.

In addition, it is regardless to say that the input and output interface 158 can be connected to an external device such as an external manipulation input device (for example, a keyboard or a mouse) or an external display device of the information processing apparatus 100. Moreover, the display device 162 may be, for example, a device in which display and a user manipulation are possible, such as a touch panel.

The communication interface 164 is communication means included in the information processing apparatus 100 and functions as the communication section 102 that performs wireless or wired communication with an external apparatus such as the first imaging apparatus 200 or the second imaging apparatus 300 via the network 400 (or directly). Here, as the communication interface 164, for example, a communication antenna and a radio frequency (RF) circuit (for wireless communication), an IEEE 802.15.1 port and a transmission and reception circuit (for wireless communication), an IEEE 802.11 port and a transmission and reception circuit (for wireless communication), or a local area network (LAN) terminal and a transmission and reception circuit (for wired communication) can be exemplified. Moreover, the communication interface 164 may be an arbitrary configuration corresponding to the network 400.

The information processing apparatus 100 that has, for example, the configuration illustrated in FIG. 8 performs the process related to the information processing method according to the embodiment. In addition, a hardware configuration of the information processing apparatus 100 according to the embodiment is not limited to the configuration illustrated in FIG. 8.

For example, the information processing apparatus 100 does not have to include the communication interface 164 in a case in which communication with an external apparatus is performed via a connected external communication device. Moreover, the communication interface 164 may be capable of performing communication with one or two or more external apparatuses in conformity with a plurality of communication schemes.

Moreover, for example, the information processing apparatus 100 does not have to include the recording medium 156, the manipulation input device 160, or the display device 162.

Further, the information processing apparatus 100 can employ, for example, a configuration according to an application example of the information processing apparatus 100 to be described later.

Moreover, a part or the whole of the structural elements illustrated in FIG. 8 (or a configuration according to a modification example) may be realized by one or two or more integrated circuits (ICs).

Referring back to FIG. 7, an example of the configuration of the information processing apparatus 100 will be described. The communication section 102 is communication means included in the information processing apparatus 100 and performs wireless or wired communication with an external apparatus such as the first imaging apparatus 200 or the second imaging apparatus 300 via a network 400 (or directly). Moreover, the communication of the communication section 102 is controlled by, for example, the control section 106.

Here, as the communication section 102, for example, a communication antenna and an RF circuit or a LAN terminal and a transmission and reception circuit can be exemplified. However, the configuration of the communication section 102 is not limited to the foregoing configuration. For example, the communication section 102 can have a configuration corresponding to any standard capable of performing communication, such as a USB terminal and a transmission and reception circuit or have any configuration capable of communicating an external apparatus via a network 400. Moreover, the communication section 102 may have a configuration capable of performing communication with one or two or more external apparatuses in conformity with a plurality of communication schemes.

The memory section 104 is a memory measure that the information processing apparatus 100 equips, and memorizes, for example, various data, such as data related to the information processing method according to the present embodiments, such as three-dimensional data and image feature value data showing a first image feature value, and various applications. In FIG. 7, shown is an example where the three-dimensional data 120 and the image feature value data 122 are memorized in the memory section 104.

Here, as the memory section 104, for example, a magnetic recording medium such as a hard disk and a nonvolatile memory such as a flash memory, or the like can be exemplified. Moreover, the memory section 104 may be detachably mounted on the information processing apparatus 100.

The control section 106 includes, for example, MPU etc., and plays a role of controlling the whole information processing apparatus 100. Moreover, the control section 106 includes, for example, an estimation processing section 110, a transmission control section 112, and a setting processing section 114, and plays a role of performing a process related to the information processing method according to the present embodiment with a leading manner.

The estimation processing section 110 plays a role of performing the estimating process indicated in the above-described (1), and estimates the position and attitude of the first imaging apparatus 200 on the basis of the three-dimensional data and the first image feature value that are set and the second image feature value acquired from a captured image captured by the first imaging apparatus 200.

For example, as shown in FIG. 4, the estimation processing section 110 performs matching for making the first image feature value correspond to the second image feature value, and estimates the position and attitude of the first imaging apparatus 200 on the basis of three-dimensional data and an image feature value acquired as a result of the matching.

The transmission control section 112 plays a role of performing the transmission control process indicated in the above-described (2). The transmission control section 112 causes the information showing the position and attitude of the first imaging apparatus 200 estimated in the estimation processing section 110 to be transmitted to an external apparatus, such as the first imaging apparatus 200. Moreover, for example, the transmission control section 112 may cause a depth map to be transmitted to an external apparatus, such as the first imaging apparatus 200.

The setting processing section 114 plays a role of performing the setting process indicated in the above-described (3). The setting processing section 114, for example, performs one or both of a setting process related to the first example indicated in the above-described (3-1) and a setting process related to the second example indicated in the above-described (3-2).

The control section 106, for example, plays a role of performing a process related to the information processing method according to the present embodiment in a leading manner by including the estimation processing section 110, the transmission control section 112, and the setting processing section 114.

In this connection, the configuration of the control section 106 is not limited to the example shown in FIG. 7. For example, it is possible for the control section 106 to include a configuration corresponding to a method of separating a process related to the information processing method according to the present embodiment. With citing one example, the control section 106 may include a three-dimensional configuration processing section that performs a three-dimensional configuration process, or may include an integrating process that performs an integration process.

The information processing apparatus 100, for example, with a configuration shown in FIG. 7, performs a process (for example, the estimating process indicated in the above-described (1), the transmission control process indicated in the above-described (2), and the setting process indicated in the above-described (3)) related to the information processing method according to the present embodiment. Therefore, the information processing apparatus 100, for example, with a configuration shown in FIG. 7, can estimate the position and attitude of an imaging apparatus.

Further, for example, with the configuration illustrated in FIG. 7, the information processing apparatus 100 can obtain the effect obtained by performing the process related to the information processing method according to the present embodiment described above.

Further, the configuration of the information processing apparatus according to the present embodiment is not limited to the configuration illustrated in FIG. 7.

For example, the information processing apparatus according to the present embodiment can include one or two or more of the estimation processing section 110, the transmission control section 112, and the setting processing section 114 shown in FIG. 7 separately from the control section 106 (for example, realizes with another processing circuit).

Moreover, the information processing apparatus according to the present embodiment may not include one or the both of the transmission control section 112 and the setting processing section 114 shown in FIG. 7. Even in the configuration that does not include one or the both of the transmission control section 112 and the setting processing section 114, the information processing apparatus according to the present embodiment can estimate the position and attitude of an imaging apparatus by performing the estimating process indicated in the above-described (1). Moreover, even in the configuration that does not include one or both of the transmission control section 112 and the setting processing section 114, the information processing apparatus according to the present embodiment can attain the effect attained by the matter that the estimating process indicated in the above-described (1) is performed.

Further, the configuration for implementing the process related to the information processing method according to the present embodiment is not limited to the configuration illustrated in FIG. 7, and a configuration corresponding to the method of dividing the process related to the information processing method according to the present embodiment may be employed. With citing one example, the information processing apparatus according to the present embodiment may include the three-dimensional configuration processing section that performs a three-dimensional configuration process, and may include an integrating process that performs an integrating process.

Further, for example, in a case in which communication with the external apparatus is performed via the external communication device having a similar function and configuration to the communication section 102, the information processing apparatus according to the present embodiment may not include the communication section 102.

Moreover, for example, in the case of using the data memorized in the external recording medium for the process, the information processing apparatus according to the present embodiment may not include the memory section 104.

The constituent elements of the information processing system according to the present embodiment has been described in connection with an information processing apparatus, but the present embodiment is not limited to such a form. The present embodiment can be applied to various devices which are capable of performing the process related to the information processing method according to the present embodiment such as, for example, "computers such as personal computers (PCs) or servers," "tablet type apparatuses," or "game machines." Further, for example, the present embodiment can also be applied to processing ICs which can be incorporated into the above-mentioned devices.

Further, the information processing apparatus according to the present embodiment may be applied to a processing system based on a connection to a network (or communication between apparatuses) such as cloud computing or the like. An example of the processing system in which the process related to the information processing method according to the present embodiment is performed may be, for example, a "system in which some of the processes related to the information processing method according to the present embodiment are performed by one of apparatuses constituting the processing system, and the remaining processes excluding some of the processes related to the information processing method according to the present embodiment are performed by other apparatuses constituting the processing system."

Moreover, the description has been given by citing the first imaging apparatus as a constituent element of the information processing system according to the present embodiment. However, the present embodiment is not limited to such a mode. The present embodiment can be applied to, for example, a portable type imaging apparatus capable of performing imaging by an imaging device that is equipped, or an external imaging device that is connected. As a portable type imaging apparatus according to the present embodiment, cited are, for example, arbitrary apparatuses in which a position and an attitude are changeable, such as "a portable type camera, such as a portable type digital still camera and a portable type digital video camera", "a communication device capable of performing imaging, such as a smart phone and a mobile phone", "tablet type device capable of performing imaging" and "a game machine capable of performing imaging".

Moreover, the first imaging apparatus according to the present embodiment is not limited to an apparatus whose position and attitude are changeable like a portable type imaging apparatus. For example, the first imaging apparatus according to the present embodiment may be an arbitrary apparatus whose position and attitude are not known in the information processing apparatus according to the present embodiment, such as a fixed camera whose position and attitude are not known in the information processing apparatus according to the present embodiment.

Moreover, description has been given by citing the second imaging apparatus as a constituent element of the information processing system according to the present embodiment. However, the present embodiment is not limited to such a mode. In the present embodiment, cited is, for example, an arbitrary apparatus that can perform imaging with an imaging device that is equipped, or an external imaging device that is connected, and whose position and attitude are not known in the information processing system according to the present embodiment. With citing one example, as the second imaging apparatus, cited are fixed cameras, such as a digital still camera that is installed at a fixed position set beforehand, a digital video camera that is installed at a fixed position set beforehand, and a security camera that is installed at a fixed position set beforehand. Moreover, as other examples of the second imaging apparatus, cited are, for example, "a communication device whose position and attitude are known, and that can perform imaging such as a smart phone and a mobile phone", "a tablet type device whose position and attitude are known, and that can perform imaging", and "a game machine whose position and attitude are known, and that can perform imaging".

(Program According to Present Embodiment)

By the matter that a program for making a computer system function as the information processing apparatus according to the present embodiment (for example, a program capable of executing a process related to the information processing method according to the present embodiment such as "a setting process indicated in the above-described (1)" and "a setting process indicated in the above-described (1) and a process of one or both of a transmission control process indicated in the above-described (2) and a setting process indicated in the above-described (3)") is executed by a processor etc. in a computer system, it is possible to estimate the position and attitude of an imaging apparatus. Here, as the computer system according to the present embodiment, cited is a single computer or a plurality of computers. By the computer system according to the present embodiment, a series of processes related to the information processing method according to the present embodiment is performed.

Further, when a program causing a computer system to function as the information processing apparatus according to the present embodiment is executed by a processor or the like in the computer system, it is possible to obtain the effect obtained by the process related to the information processing method according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above example, the program (computer program) causing the computer system to function as the information processing apparatus according to the present embodiment is provided, but the present embodiment further provides a recording medium having the program recorded therein together.

The configuration mentioned in the above shows one example of the present embodiment, and, naturally, belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus, including:

an estimation processing section that, on the basis of three-dimensional data and a first image feature value that are set and a second image feature value that is acquired from a captured image captured by a first imaging apparatus, estimates a position and attitude of the first imaging apparatus.

(2)

The information processing apparatus according to (1), in which the first image feature value includes an image feature value that is acquired from a captured image captured by a second imaging apparatus whose position and attitude are known.

(3)

The information processing apparatus according to (1) or (2), in which the estimation processing section estimates the position and attitude of the first imaging apparatus on the basis of the second image feature value that is acquired from the captured image captured in the first imaging apparatus and the first image feature value that is acquired from a captured image captured at a same time as the captured image captured by the first imaging apparatus.

(4)

The information processing apparatus according to any one of (1) to (3), in which the three-dimensional data is three-dimensional data generated on the basis of a captured image captured by a second imaging apparatus whose position and attitude are known.

(5)

The information processing apparatus according to any one of (1) to (4), in which the estimation processing section performs matching for making the first image feature value and the second image feature value correspond to each other, and estimates the position and attitude of the first imaging apparatus on the basis of the three dimensional data and an image feature value acquired as a result of the matching.

(6)

The information processing apparatus according to any one of (1) to (5), further including a setting processing section that performs a process of setting the three-dimensional data and the first image feature value.

(7)

The information processing apparatus according to (6), in which the setting processing section updates the three-dimensional data on the basis of the captured image captured by the first imaging apparatus whose position and attitude have been estimated.

(8)

The information processing apparatus according to (7), in which the setting processing section performs three-dimensional construction on the basis of the captured image captured by the first imaging apparatus whose position and attitude have been estimated, and updates the three-dimensional data.

(9)

The information processing apparatus according to any one of (6) to (8), in which the setting processing section updates the three-dimensional data on the basis of a captured image captured by the second imaging apparatus whose position and attitude are known.

(10)

The information processing apparatus according to any one of (6) to (9), in which the setting processing section updates the first image feature value on the basis of the captured image captured by the first imaging apparatus whose position and attitude have been estimated.

(11)

The information processing apparatus according to any one of (6) to (10), in which the setting processing section updates the first image feature value on the basis of a captured image captured by a second imaging apparatus whose position and attitude are known.

(12)

The information processing apparatus according to any one of (1) to (11), further including a transmission control section that causes information showing the estimated position and attitude of the first imaging apparatus to be transmitted to an external apparatus.

(13)

The information processing apparatus according to (12), in which the transmission control section causes a depth map generated on the basis of one or both of the capture image captured by the first imaging apparatus whose position and attitude have been estimated and a captured image captured by a second imaging apparatus whose position and attitude are known, to be transmitted to the external apparatus.

(14)

The information processing apparatus according to (12) or (13), in which the external apparatus is the first imaging apparatus whose position and attitude have been estimated.

(15)

The information processing apparatus according to any one of (1) to (14), in which the first imaging apparatus is a portable type imaging apparatus.

(16)

An information processing method executed by an information processing apparatus, the information processing method including:

a step of setting three-dimensional data and a first image feature value; and a step of estimating, on the basis of the three-dimensional data and the first image feature value that are set and a second image feature value that is acquired from a captured image captured by a first imaging apparatus, a position and attitude of the first imaging apparatus.

(17)

A program that makes a computer realize:

a function that sets three-dimensional data and a first image feature value; and a function that estimates, on the basis of the three-dimensional data and the first image feature value that are set and a second image feature value acquired from a captured image captured by a first imaging apparatus, a position and attitude of the first imaging apparatus.

REFERENCE SIGNS LIST

100 information processing apparatus
102 communication section 104 memory section
106 control section
110 estimation processing section
112 transmission control section
114 setting processing section
200 first imaging apparatus
300 second imaging apparatus
1000 information processing system

The invention claimed is:

1. An information processing apparatus, comprising:
a processing unit configured to:
acquire a second image feature value corresponding to a first image captured by a first imaging apparatus which is a portable type imaging apparatus;
set three-dimensional data of an object, wherein the three-dimensional data is generated based on a second image captured by a second imaging apparatus at a fixed position;
set a first image feature value, wherein the first image feature value is generated based on a quantitative value corresponding to a feature of the second image;
match the first image feature value with the second image feature value;
extract a third image feature value based on the match of the first image feature value with the second image feature value, wherein the third image feature value is within a range between the first image feature value and the second image feature value; and
estimate a position and an attitude of the first imaging apparatus based on the extracted third image feature value and the set three-dimensional data.

2. The information processing apparatus according to claim 1, wherein the second imaging apparatus has a specific position and a specific attitude.

3. The information processing apparatus according to claim 1, wherein the processing unit is further configured to acquire the first image feature value corresponding to the second image captured at a time same as a time of the capture of the first image.

4. The information processing apparatus according to claim 1, wherein the three-dimensional data is generated based on the second image captured by the second imaging apparatus with a specific position and a specific attitude.

5. The information processing apparatus according to claim 1, wherein the processing unit is further configured to update the three-dimensional data based on the first image captured by the first imaging apparatus with the estimated position and the estimated attitude.

6. The information processing apparatus according to claim 5, wherein the processing unit is further configured to:
execute a three-dimensional construction based on the first image captured by the first imaging apparatus.

7. The information processing apparatus according to claim 1, wherein the processing unit is further configured to update the three-dimensional data based on the second image captured by the second imaging apparatus with a specific position and a specific attitude.

8. The information processing apparatus according to claim 1, wherein the processing unit is further configured to update the first image feature value based on the first image captured by the first imaging apparatus with the estimated position and the estimated attitude.

9. The information processing apparatus according to claim 1, wherein the processing unit is further configured to update the first image feature value based on the second image captured by the second imaging apparatus with a specific position and a specific attitude.

10. The information processing apparatus according to claim 1, wherein the processing unit is further configured to control transmission of information associated with the estimated position and the estimated attitude of the first imaging apparatus to an external apparatus.

11. The information processing apparatus according to claim 10, wherein
the processing unit is further configured to:
generate a depth map based on at least one of:
the first image captured by the first imaging apparatus with the estimated position and the estimated attitude, or
the second image captured by the second imaging apparatus with a specific position and a specific attitude; and
control transmission of the depth map to the external apparatus.

12. The information processing apparatus according to claim 10, wherein the external apparatus is the first imaging apparatus with the estimated position and the estimated attitude.

13. The information processing apparatus according to claim 1, wherein the processing unit is further configured to:
set a range for a time difference between a first time stamp corresponding to the capture of the first image and a second time stamp corresponding to the capture of the second image; and
acquire the first image feature value corresponding to the second image in which the second time stamp is within the set range of the time difference.

14. The information processing apparatus according to claim 1, wherein the processing unit is further configured to:
exclude a number of three-dimensional data of the set three-dimensional data from the set three-dimensional data based on the estimated position and the attitude of the first imaging apparatus;
compare the excluded number of three-dimensional data and the second image feature value with a threshold number; and
determine, based on a result of the comparison of the excluded number of three-dimensional data and the second image feature value with the threshold number, whether the position and the attitude of the first imaging apparatus has been estimated.

15. An information processing method executed by an information processing apparatus, the information processing method comprising:
acquiring a second image feature value corresponding to a first image captured by a first imaging apparatus which is a portable type imaging apparatus;
setting three-dimensional data of an object, wherein the three-dimensional data is generated based on a second image captured by a second imaging apparatus at a fixed position;
setting a first image feature value, wherein the first image feature value is generated based on a quantitative value corresponding to a feature of the second image;
matching the first image feature value with the second image feature value;
extracting a third image feature value based on the match of the first image feature value with the second image feature value, wherein the third image feature value is within a range between the first image feature value and the second image feature value; and
estimating a position and an attitude of the first imaging apparatus based on the extracted third image feature value and the set three-dimensional data.

16. A non-transitory computer-readable medium having stored thereon computer-executable instructions that, when executed by a computer, cause the computer to execute operations, the operations comprising:
- acquiring a second image feature value corresponding to a first image captured by a first imaging apparatus which is a portable type imaging apparatus;
- setting three-dimensional data of an object, wherein the three-dimensional data is generated based on a second image captured by a second imaging apparatus at a fixed position;
- setting a first image feature value, wherein the first image feature value is generated based on a quantitative value corresponding to a feature of the second image;
- matching the first image feature value with the second image feature value;
- extracting a third image feature value based on the match of the first image feature value with the second image feature value, wherein the third image feature value is within a range between the first image feature value and the second image feature value; and
- estimating a position and an attitude of the first imaging apparatus based on the extracted third image feature value and the set three-dimensional data.

\* \* \* \* \*